United States Patent [19]

Hammer et al.

[11] Patent Number: 5,056,003
[45] Date of Patent: Oct. 8, 1991

[54] DISTRIBUTED DATA MANAGEMENT MECHANISM

[75] Inventors: William E. Hammer, Rochester; Walter H. Schwane, Kasson; Frederick J. Ziecina, Rochester, all of Minn.

[73] Assignee: International Business Machines Corporation, Armonk, N.Y.

[21] Appl. No.: 285,369

[22] Filed: Dec. 15, 1988

Related U.S. Application Data

[63] Continuation of Ser. No. 745,545, Jun. 17, 1985, abandoned.

[51] Int. Cl.⁵ ............................................. G06F 13/38
[52] U.S. Cl. ................................................... 364/200
[58] Field of Search .................. 364/200 MS, 900 MS

[56] References Cited

U.S. PATENT DOCUMENTS

| | | | |
|---|---|---|---|
| 3,938,096 | 2/1976 | Brown et al. | 364/200 |
| 4,285,040 | 8/1981 | Carlson et aL. | 364/200 |
| 4,330,822 | 5/1982 | Dodson | 364/200 |
| 4,369,494 | 1/1983 | Bienvenu et al. | 364/200 |
| 4,430,699 | 2/1984 | Segarra et al. | 364/200 |
| 4,466,063 | 8/1984 | Segarra et al. | 364/200 |
| 4,539,637 | 9/1985 | De Bruler | 364/200 |
| 4,543,626 | 9/1985 | Bean et al. | 364/200 |
| 4,543,627 | 9/1985 | Schwab | 364/200 |
| 4,564,900 | 1/1986 | Smitt | 364/200 |
| 4,597,044 | 6/1986 | Circello | 364/200 |
| 4,649,473 | 3/1987 | Hammer et al. | 364/200 |
| 4,819,159 | 4/1989 | Shipley et al. | 364/200 |
| 4,825,354 | 4/1989 | Agrawal et al. | 364/200 |
| 4,974,149 | 11/1990 | Valenti | 364/200 |

OTHER PUBLICATIONS

Vol. 23, No. 5, p. 1805, Oct. 1980, Distributed Data Processing System.
Vol. 22, No. 7, p. 2893, Dec. 1979, Message-Based Protocol for Interprocessor Communication.
Vol. 21, No. 7, p. 2653, Dec. 1978, Directorized Data Descriptor.

Primary Examiner—Gareth D. Shaw
Assistant Examiner—Maria Napiorkowski
Attorney, Agent, or Firm—Bradley A. Forrest; Roy W. Truelson

[57] ABSTRACT

A data management mechanism for a processor system provides for management of data with minimum data transfer between processes executing work requests. Each process has storage areas for storing data associated with work requests. The data is described with descriptor elements in the work requests which indicate the location and length of segments of the data. Data is transferred to a process only if it is required for execution of a work request. Further work requests can be generated by a process executing a work request which reference the data without the process actually receiving the data. The segments of data may reside in storage areas of different processors with the descriptor elements of a work request defining a logical data stream.

8 Claims, 1 Drawing Sheet

WHERE KEY OPTIONS ARE:

DISTRIBUTED DATA MANAGEMENT MECHANISM

This is continuation of co-pending application Ser. No. 745,545 filed on 6/17/85, now abandoned.

CROSS REFERENCE TO RELATED DOCKETS

Reference is hereby made to U.S. Pat. No. 4,649,473 for Flexible Data Transmission for message Based Protocols and U.S. patent application Ser. No. 745,753 for Process Transparent Multi Storage Mode Data Transfer and Buffer Control filed on the same date herewith and assigned to the same assignee as this application.

BACKGROUND OF THE INVENTION

The invention relates to a distributed data management mechanism and in particular, to a distributed data management mechanism wherein the data may be distributed noncontiguously in one or more storage areas.

In conventional distributed processor systems, many different processes are executing on different processors. Some processors are causing more than one process to be executed. Many times, the processes are required to pass data required for execution of work. A requestor process generates work requests which have associated data. A server of work is required to receive data related to the work request from the requesting process. This is even necessary when the server's only purpose is to modify a command to add header and trailer information to the original data, or data stream and pass the modified data stream to another server in a hierarchy of servers. If the processes are executing on the same processor, the data remains in that processor's storage and is accessible by both processes.

IBM Technical Disclosure Bulletin Vol. 23 No. 5 October 1980, Distributed Data Processing System, describes a processing system wherein system resources belong to processes and communication between processes is indirect via supervisor services. This provides some process mobility. Communication is in terms of messages processed by subsystem communication facilities. IBM Technical Disclosure Bulletin Vol. 22 No. 7 December 1979, Message-Based Protocol for Interprocessor Communication, discloses a message-based protocol for communicating between processes executing on different processors loosely coupled via a common bus. Processes are defined as execution units which interact through message queues and through shared variables.

The movement of data with the work requests results in extraneous data moves across physical transport mechanisms connecting the processors. It also places an unnecessary storage requirement on the processors where the data must be received, but is not acted on.

SUMMARY OF THE INVENTION

A data management mechanism for a loosely coupled distributed processor system manages the storage and transfer of data between processes. The data management mechanism uses descriptor elements to refer to the data. The descriptor elements indicate the location and length of one or more pieces of the data which when combined form a logical data string. Processes executing work requests are only provided the data requested by the process which is necessary to execute the work requests. A process adds data to the logical data string without receiving unnecessary data by using a descriptor element.

The data management mechanism eliminates many data moves across physical transport mechanisms connecting the processors because the data is moved only when a process requires the data to perform a work request. The process executing the work request many times generates a further work request to yet a different process. This further work request is capable of referencing the data stream associated with the first work request. The process executing the further work request can receive parts of the data stream if required, and can add to the data stream using descriptor elements to identify the location of added data.

Storage requirements are reduced by the data management mechanism because a logical data stream potentially resides in segments at different processor storage locations. Since all of the data stream is not required to be passed to storage directly accessible by each process executing a work request which references the data stream, the storage required is reduced. This permits a heavier work load for a given processor without increasing that processor's storage. The processor can handle more work requests at a given time because only segments of data required for each work request are received in the processor's storage.

Where a hierarchy of servers is required for a work request, secondary work requests are prepared by the servers. These secondary work requests reference the logical byte stream and often create new logical byte streams by referring to selected portions of the logical byte stream, which portions may reside in storage of different processors. This can occur without the movement of the logical byte stream, or with the movement of segments to storage accessible by processes requiring the data. This flexibility further reduces data transfers by the transport mechanism and reduces storage requirements.

DETAILED DESCRIPTION OF THE PREFERRED EMBODIMENT

Figure 1:
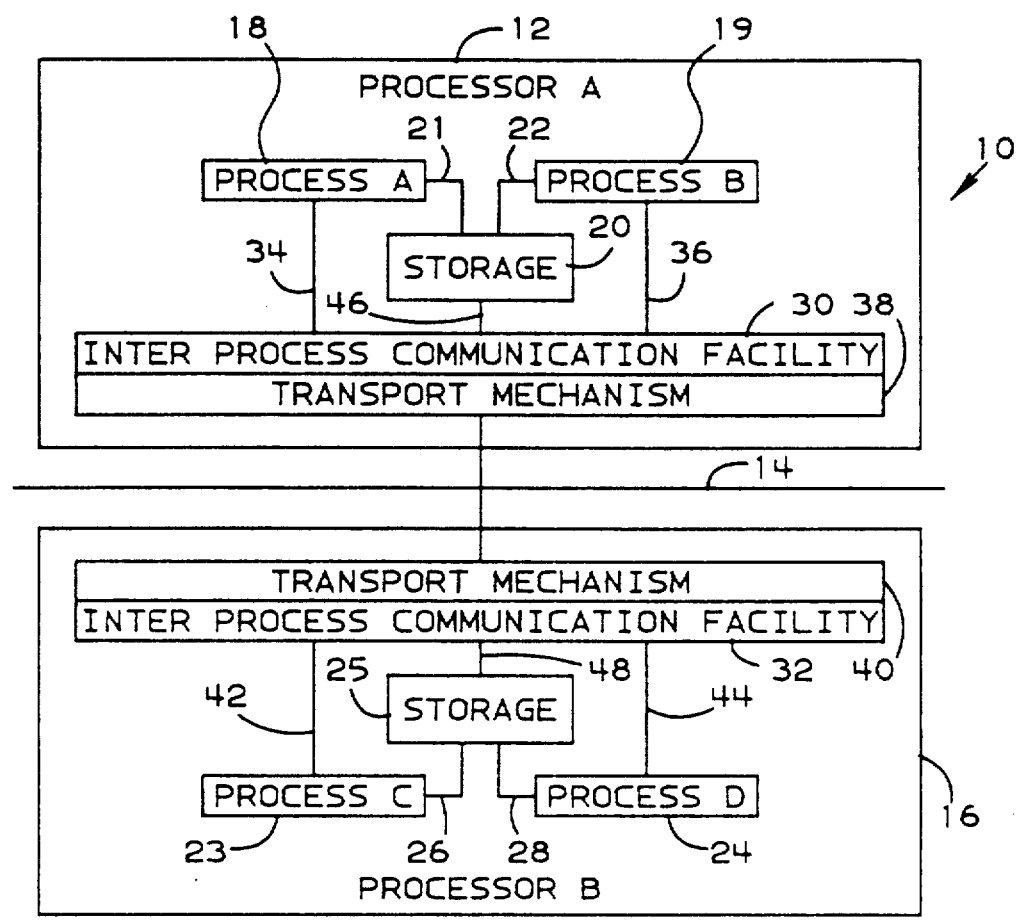
FIG. 1 is a block diagram overview of a multiprocess system having an inter process communication facility for communication between processes.

In FIG. 1 a high level view of a distributed process environment is indicated generally at 10. A processor A indicated at 12 is coupled by a physical path indicated by a line 14 to a processor B indicated at 16. Processor A is indicated as having a process A indicated at 18 and a process B indicated at 19 residing therein. A storage area 20 is associated with process A and process B as represented by lines 21 and 22 respectively to provide the processes control of and access to data storage.

Processor B is indicated as having a process C indicated at 23 and a process D indicated at 24 residing therein. A storage area 25 is associated with process C and process D as represented by lines 26 and 28 respectively to provide the processes control of and access to data storage.

Processes, or executing programs within the processors need to communicate with each other. In processors of differing configurations, or in the same processor as it changes over time, two processes that communicate may be in different relative locations and may have different physical paths between them.

An inter process communication facility (IPCF) is provided within processor A and processor B at 30 and 32 respectively to accommodate inter process communication which is location transparent to the communicating processes. IPCF 30 is coupled to process A in processor A as represented by a line 34 and to process B as represented by a line 36. Lines 34 and 36 represent interfaces between process A and process B to the IPCF 30. These interfaces permit communication between process A and process B provided appropriate data paths are established. IPCF 30 is also coupled through a transport mechanism 38 by line 14 through a transport mechanism 40 in processor B to IPCF 32. IPCF 32 is in turn coupled as represented by interface lines 42 and 44 to process C and process D. These interfaces with the IPCFs and the transport mechanisms permit establishment of communication between all the processes indicated, without process knowledge of the location of the process it is communicating with.

The transport mechanisms 38 and 40 preferably comprise a plurality of transport mechanisms such as local transport mechanisms for use when process A and process B or process C and process D communicate within a single processor. If processor A and processor B reside in the same machine, a bus transport mechanism is used to facilitate communication between processes on processor A and processor B. For intermachine communication, a communication protocol such as SNA is suitable for use.

The transport mechanisms 38, 40 are data movers. They are responsible for transferring bytes of data from one place to another and do not understand the meaning of the information being moved. Thus, storage 20 in processor A is coupled to the transport mechanism 38 as represented by a line 46 and storage 25 in processor B is coupled to transport mechanism 40 as represented by a line 48 to permit information transfers directly by the transport mechanisms 38, 40.

The IPCF of the process attempting to communicate chooses the transport mechanism for the communication. The communicating processes need not be aware of the mechanism used. The process attempting to communicate supplies the name of the target process, as it is known to the process attempting to communicate, to the IPCF which uses an appropriate directory service to locate it. The IPCF then selects the appropriate transport mechanism and uses system-supplied services to set up the connection between the processes in a standard manner. IPCF can be used by all levels of processes, from applications to basic system services such as a paging manager.

To permit the use of many different transport mechanisms, each with different capabilities and characteristics, the IPCF includes a generic transport mechanism interface to each process. The interface defines a set of function-s-for the establishment of connections and for the passing of information between processes. The functions defined are mapped onto the transport mechanisms used by IPCF. Programs written to the interface are independent of the transport mechanism and therefore are independent of their relative locations when communicating.

Communication between processes is in terms of sending and receiving messages over a connection between them as established by IPCF. The messages contain work requests and/or data. Relative to a particular work request, a process assumes the role of a requestor or a server. The requestor initiates a work request by sending a request to a server that carries it out. Requests contain a work request (a command and its parameters) and optionally some data. Both the request and the data are of variable length.

Figure 2:
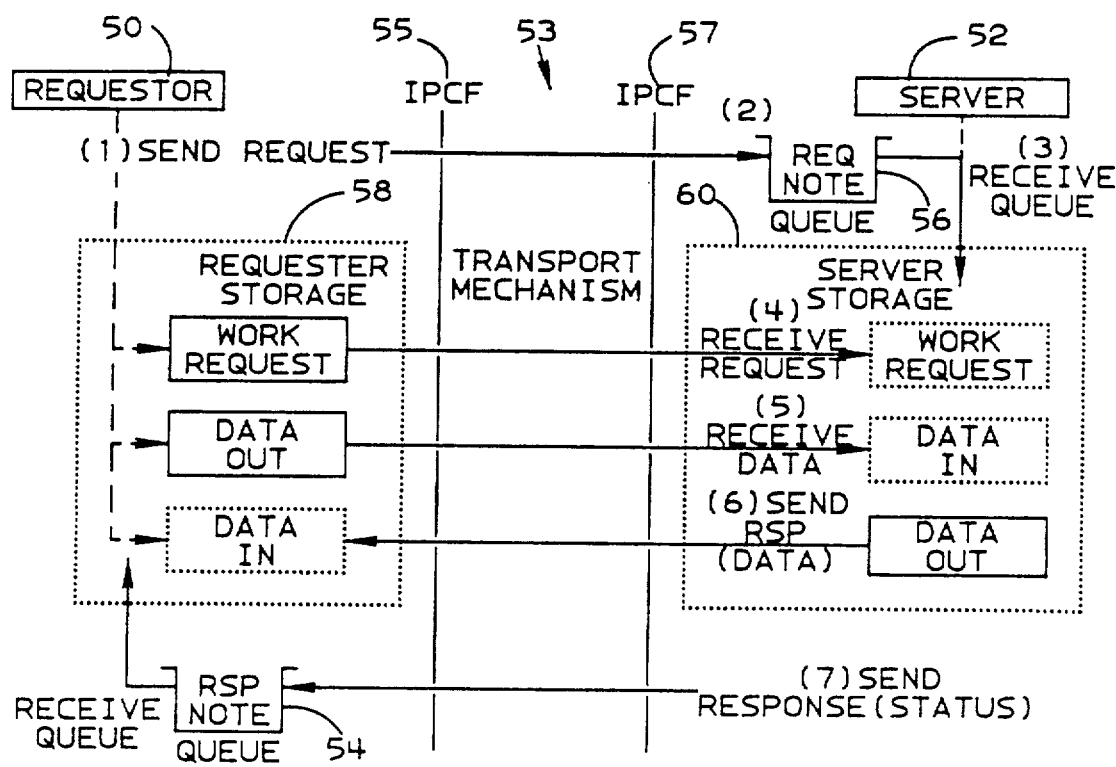
FIG. 2 is a low level representation of two processes communicating via the inter process communication facility of FIG. 1.

In FIG. 2, which is a low level view of two communicating processes, the sending of a work request by a requestor process 50 and serving of the work request by a server process 52 is represented with steps indicated in ascending numerical order. A connection between requestor process 50 and server process 52 has already been established by IPCF and the transport mechanism as indicated generally at 53. Each process has a queue associated with it which is used to queue notes, which are small packets of data representative of work requests originating from other processes. Process 50 has a queue 54 provided by its local IPCF 55 and process 52 has a queue 56 provided by its local IPCF 57.

The requestor process 50 prepares the work request which is stored in requestor storage 58. The requestor process 50 also prepares an IPCF verb referred to as a Send Request verb (1). The Send Request verb is what the process uses to indicate to IPCF 55 that a work request has been prepared for serving by another process. It contains information (the content of IPCF verbs is described later) which the IPCF 57 local to server 52 distills into one kind of note. The note is referred to ..as a request note and contains information such as who the sender is, the length of the request, and a unique request id (Rid) which is a token which uniquely identifies the work request.

Data structures are sent across the transport mechanism and contain information from which the note is distilled. The data structures indicate the request id, a connection id that identifies the server process, a request priority, and descriptor elements. Each descriptor element describes a contiguous piece of real storage. Each descriptor element identifies data to be transferred to the server or storage for data to be transferred to the requestor. Each descriptor element also indicates the processor address containing the piece of storage, and the storage address and length of the piece of storage.

The note distilled from the data structure representing the work request is placed on queue 56 (2) by the IPCF 57 local to server 52. When server 52 is ready to begin more work, it issues a Receive Queue verb (3) to receive the note. The server 52 then indicates to IPCF 57 that it wishes to receive at least a portion of the work request by means of a Receive Request verb (4) which references the request id. IPCF 57 and the transport mechanism 53 then transfer the desired portions of the work request from storage 58 to storage 60 without involvement of requestor 50. The work request is then directly accessible by server 52.

The work request contains the actual command and any parameters. At this point, the server 52 can process the request, or look for further work on its input queue. The data from the requestor 50 is received as needed. Not all of the data need be received at once. To receive the data associated with a particular request, the server supplies the appropriate request id to IPCF 57 in a Receive Data verb (5). The data indicated is then transferred by IPCF and the transport mechanism to storage 60.

Data to be returned from server 52 to the requestor 50 is sent by use of a Send Response verb (6) to the IPCF 57 in server 52. The data is then transferred by IPCF 57 and the transport mechanism directly to the requestor storage 58. When the server 52 is finished with the work request, and all data has been transferred, server 52 presents a final Send Response verb with status (7) to the IPCF 57 which transfers data structures to IPCF 55 local to requestor 50 which generates a response note which is placed on queue 54 of requestor 50. The response note indicates to requestor 50 that the work request has been completed and data resulting from the work request is available.

The use of only notes on queues permits complex queue handling schemes to be easily implemented for request queues. Since notes are small compared to all of the data for a request, they can be easily reordered. This allows a priority to be associated with requests. A server can deal with high priority requests and is not forced to remove requests from the queue only in the order they were sent. Keyed receives from the queue allow servers to receive a note only if it came over a particular connection.

SUMMARY OF VERBS

The following is a list of verbs and their function used by processes to interface with IPCF so that IPCF transfers information to other processes. The verbs will be described in further detail in a later section.

| | |
|---|---|
| Open | Establish an IPCF connection between two processes. |
| Close | Break the IPCF connection between two processes. |
| Specify Storage Pool | Define a storage pool to IPCF that may be shared by multiple processes. The use of a storage pool may eliminate the need to actually move or copy data sent between processes. |
| Send Request | Initiate a work request. The process that issues a Send Request is the requestor. The process that the request is sent to is the server. |
| Send Response | Return data and optionally status to a requestor. |
| Receive Queue | Receive a note from the process input queue. |
| Receive Request | Receive a work request sent by a requestor. |
| Receive Data | Receive the data sent by a requestor. |
| Signal | Send a signal note to another process. |
| Terminate Request | Stop the processing of an outstanding request or of all outstanding requests on a connection. |

Many of the IPCF verbs generate notes sent to the queue of the other communicating process. A Request Note is placed on a process's input queue when the process is the target of another process's Send Request verb. A Response Note is placed on a process's input queue when some other process executes a Send Response verb with completion status.

A Signal Note is placed on a process's input queue when it is the target of another process's Signal. Signal Notes are used to send small amounts of data between two processes and contain the actual data to be sent.

An Open Note is placed on a process's input queue when a connection to it has been established at the request of another process, and a Close Note is placed on a process's input queue when a connection to it is to be or has been broken by another process. The process that issued the Close verb does not get a Close Note indicating a connection is to be broken, but does receive a Close Note indicating that the Close is completed.

A Terminate Request Note is placed on a server process's input queue if the requestor terminates an outstanding request.

In the preferred embodiment, notes are placed on input queues in the following order with 1 being the top of the queue:

1. Terminate Request
2. Close
3. Open
4. Signal
5. Request and Response (in priority order)

The Receive Queue verb provides for use of a key which restricts the types of notes that will satisfy the receive. The key is used to select whether to receive notes on the basis of the type of note or on the basis of the origination of the note (by which connection the note was received from).

READ/WRITE OPERATION EXAMPLES

Figure 3:
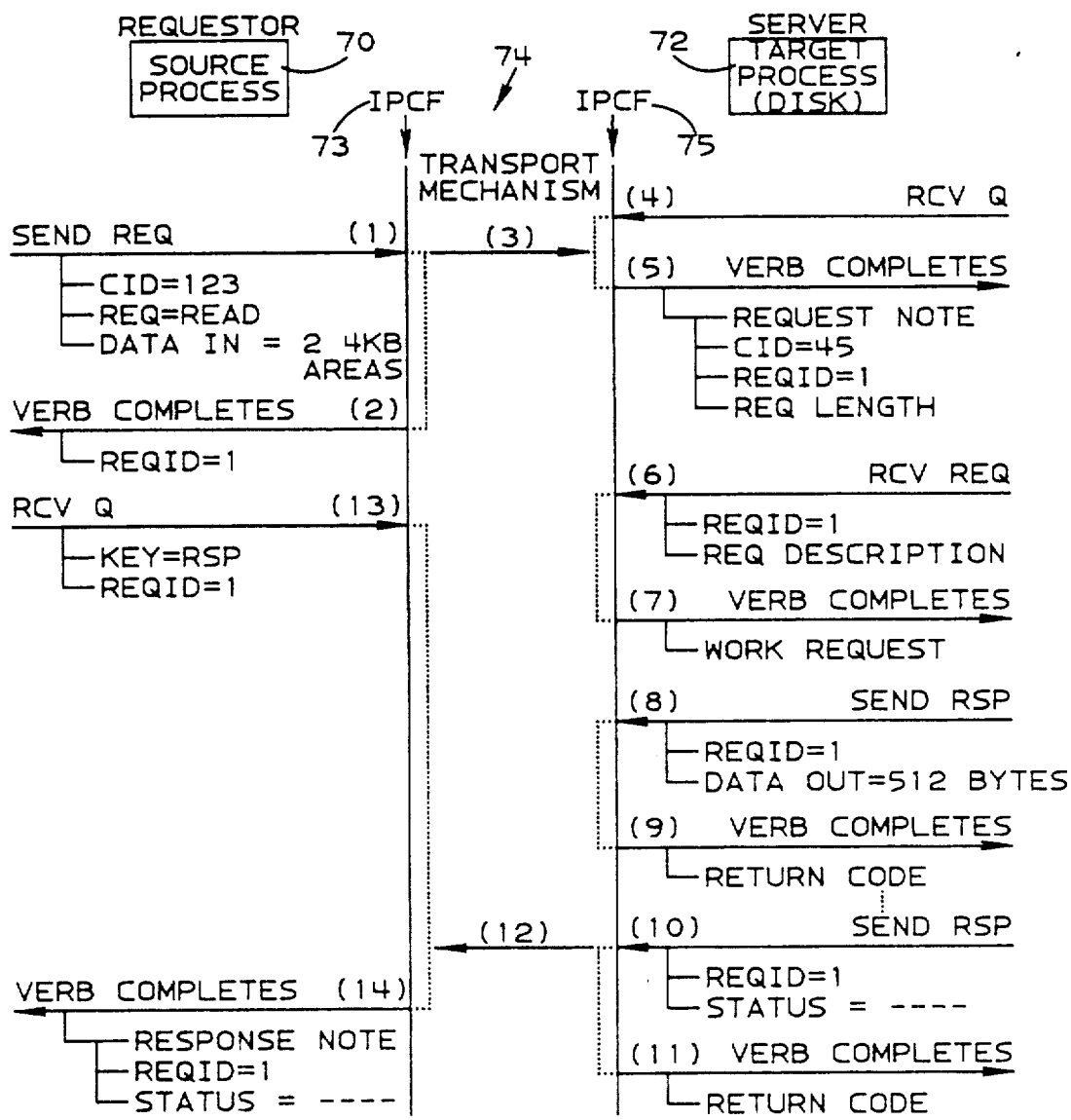
FIG. 3 is a low level representation of a process obtaining data from a disk control process via the inter process communication facility of FIG. 1.

A read operation is indicated in FIG. 3 where a requestor process 70 desires to read data from a server process 72 which in this example is a disk drive device-control program. A Send Request verb is issued (1) to IPCF 73 local by requestor 70 which contains a connection id (CID) of 123, the type of request (a read command) and specifies a data in area of two four kilobyte areas. Neither IPCF nor a transport mechanism indicated generally at 74 are aware of the contents of the request. The format and content of the Request (a read command) are by agreement between the requestor 70 and server 72. IPCF indicates (2) that the send request verb has been completed and given a request id REQID of 1.

A data structure is sent over transport mechanism 74 (3) to the IPCF 75 of the server 72. IPCF 75 local to server 72 distills a note which is placed on a queue associated with server 72. The server 72 issues a Receive Queue verb (4) and receives the request note (5) and its connection id, 45, request id, 1, and an indication of the request length. When desired, server 72 prepares a Receive Request verb (6) indicating the request id and description. IPCF returns the work request (7) without interaction with the requestor 70.

Server 72 then prepares a sequence of 16 Send Response verbs (8) (each verb identifies 512 bytes to be written) each of which includes the request id and 512 bytes of the data requested in the work request. IPCF and the transport mechanism 74 then place the data in storage indicated by the requestor in the original work request. Server 72 then receives a return code (9) upon completion of each Send Response verb and prepares a final Send Response verb (10) which contains the request id and status of the work request. Server then receives an indication that the verb has completed (11) and a response note is sent (12) to requestor 70. Requestor 70 issues a Receive Queue verb (13) having a key which requests response notes and optionally specifies request id 1. The response note is received (14) indicating the status of completion for request id 1.

Figure 4:
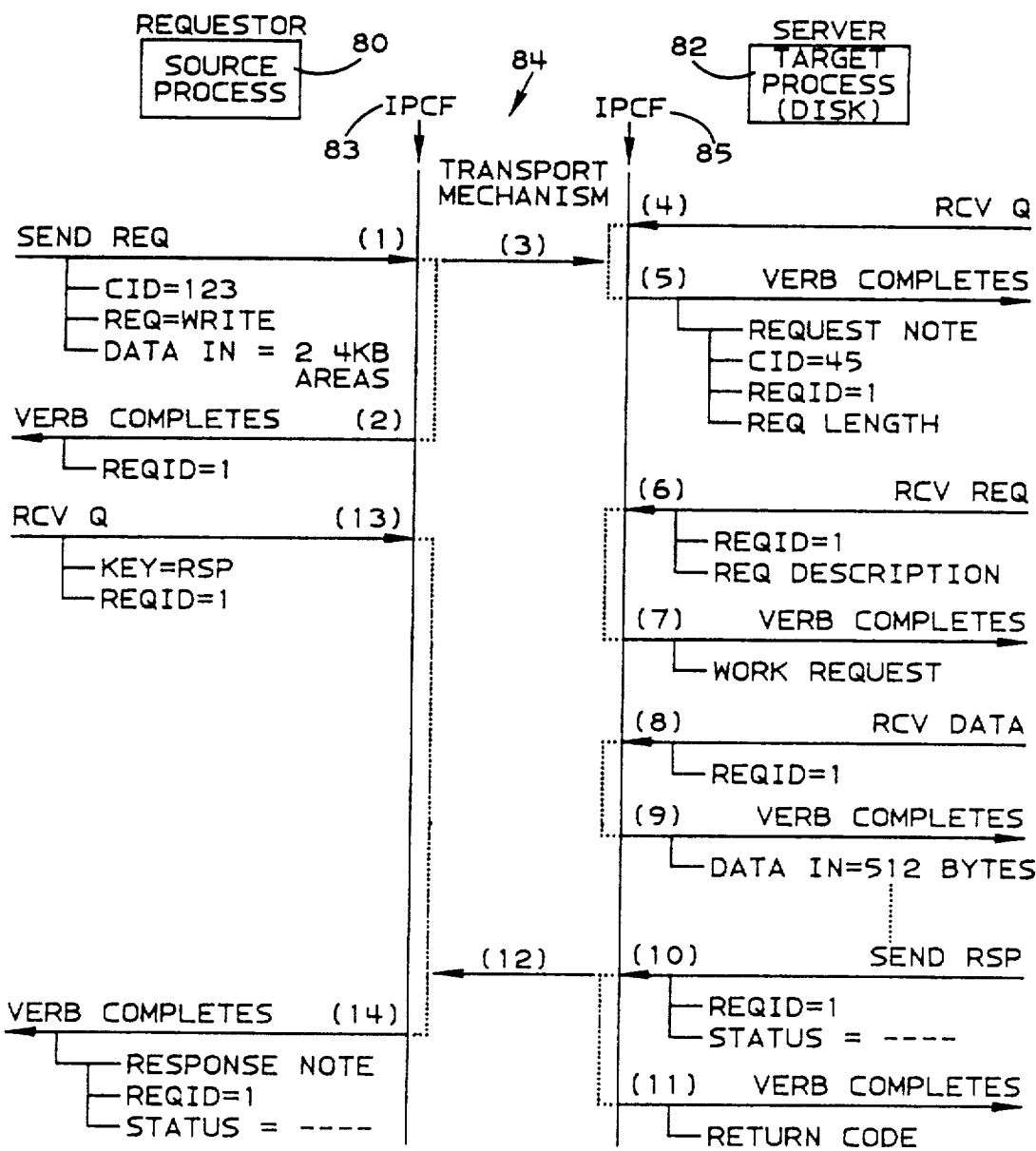
FIG. 4 is a low level representation of a process transferring data to a disk control process via the inter process communication facility of FIG. 1.

A write operation indicated in FIG. 4 is carried out much the same way, between a requestor 80 and server 82. The requestor prepares a send request verb (1) which this time specifies data out. This means that two, four KB areas are to be written. The IPCF 83 local to requestor 80 indicates verb complete (2) with a request id of 1. The request note is placed on the server's queue (3) and Receive Queue verb (4) is issued by server 82. The request note is received (5) by server 82 and a Receive Request verb (6) is sent to IPCF 85 local to server 82. The work request indicated by the Receive Request verb is then supplied (7) by IPCF and the transport mechanism 84. A Receive Data verb (8) results from the server 82 executing the work request and is given to IPCF which then causes the data to be received (9). A series of 16 Receive Data verbs are issued by server 82, since each verb is asking for 512 bytes at a time and a total of 8 kilobytes is being written.

A final Send Response verb (10) is then prepared by server 82 and indication that the Send Response verb has been completed (11) is returned to the server 82. A note is then sent by IPCF (12) to the input queue of requestor 80. Requestor 80 issues a Receive Queue verb (13) and receives the response note (14).

DATA TRANSFER MODES AND SHARED STORAGE

IPCF offers the processes several options for the handling and management of data or requests that are sent and received. These data transfer modes are, MOVE, PASS, LOCATE, and GETBUF/FREEBUF. The data transfer modes described apply to both requests and data. A requestor process is referred to as a sender when it sends a work request, and a receiver when it receives data. Similarly, a server is referred to as a receiver when it receives a work request and a sender when it returns data to the requestor.

A data access control function is defined in IPCF at each processor and provides location transparency with the defined data transfer modes. When data is sent from a sender in MOVE mode, the receiver gets a copy of the information. Each of the communicating processes always has its own copy of the information and is not aware of what the other process does with its copy of the data.

In PASS mode, the data access control function makes an intermediate copy of the data sent in storage available to either IPCF involved in the communication so that the sender's storage is available for reuse immediately.

With LOCATE mode, when the communicating processes have access to shared storage, the data access control function passes a pointer to data and the data is not moved. When the processes do not have access to shared storage, the data access control function provides a copy of the data in storage accessible to the receiver of the data.

FREEBUF allows a sender of data to pass responsibility for managing buffers to a receiver who specifies GETBUF. When the sender and receiver have access to shared storage, data moves are eliminated. When the processes do not have access to shared storage, the data access control function provides a copy of the buffers to the receiver.

Each of the communicating processes can use the data transfer mode it desires, without regard for the mode used by the other process. The data access control function handles any extra data moves or copies that may be needed without special action on the part of the communicating processes.

When sending data in MOVE mode, the sender tells the data access control function where the data is located by supplying a "data-out descriptor" DOD that describes the data being sent. This descriptor consists of one or more descriptor elements, each of which contains a length and address pair. Only a copy of the data is made available to the receiver, even if the receiver uses LOCATE or GETBUF modes. The storage containing the output data must remain available for the duration of the send operation.

When receiving data in MOVE mode, as was the mode selected by the processes in FIG. 2, the receiver or server 52 tells the data access control function at IPCF 57 where to store a copy of the data received by supplying a "data-in descriptor" DID that describes the data being received. This descriptor consists of one or more local descriptor elements, each of which contains a length and address pair. One descriptor element is supplied for each segment of storage 60 the data or work request is to be received into. The received data can be segmented however the receiver desires, and the receiver is not aware of how the data was segmented by the sender as the data access control function provides a continuous stream of data.

With MOVE mode, the storage indicated as "DATA OUT" in requestor storage 58 containing the output data must remain available for the duration of the send operation. There are times when the sending program, or requestor 50 would like to reuse this storage immediately and not have to wait until the receiving program 52 completes working on the data.

Figure 5:
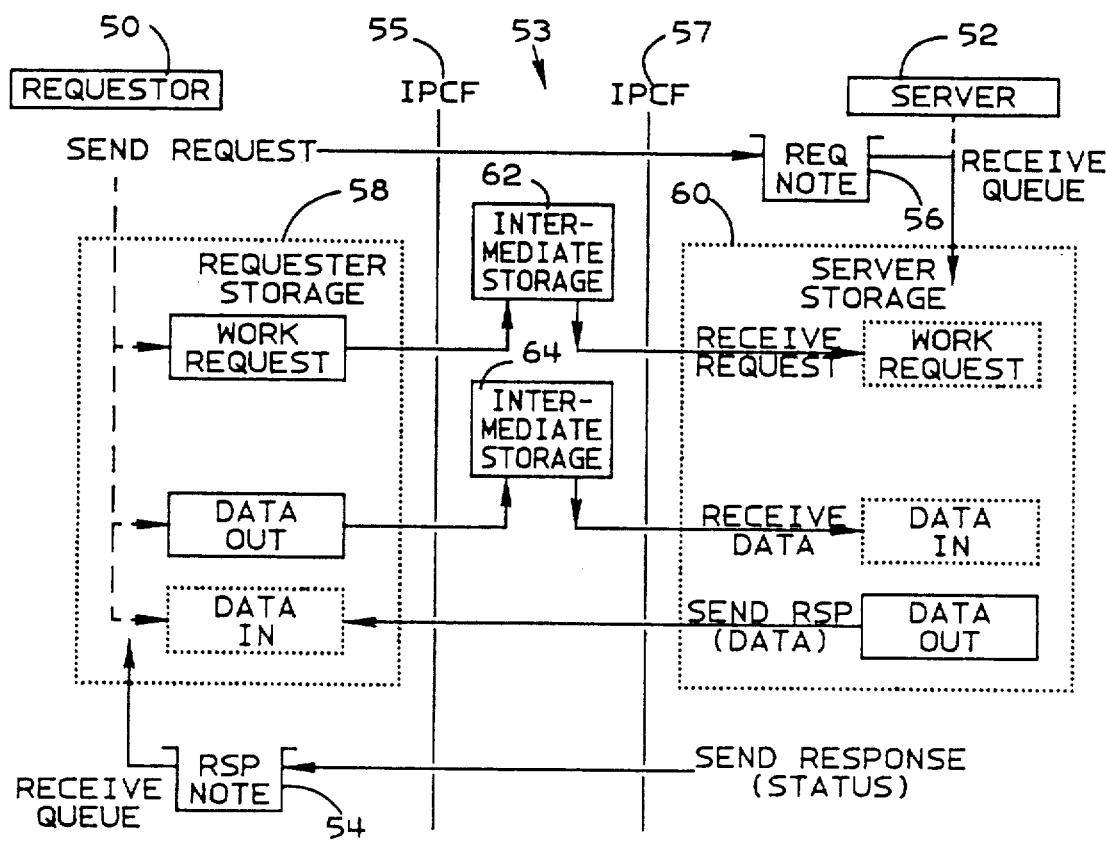
FIG. 5 is a low level representation of one type of data transfer mode selected by a process to communicate with another process via the inter process communication facility of FIG. 1.

Specifying PASS mode as requestor 50 has done in FIG. 5 wherein the numbering is consistent with FIG. 2, indicates to the data access control function at IPCF 55 that it should make an immediate copy of the data being sent. The work request is copied into intermediate storage 62 and the Data Out is copied into intermediate storage 64. When the data is received, it may be necessary to make an additional copy if the data is being received in move mode or if server 52 is in a different processor from requestor 50. All of the storage 58 described by the data out descriptors is available for reuse when the output data has been copied. This occurs before the receiving program actually completes working on the data.

Figure 6:
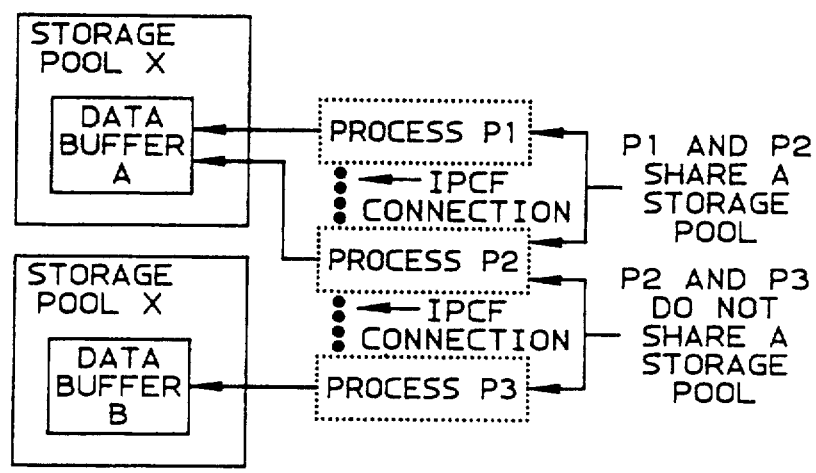
FIG. 6 is a low level representation of a further type of data transfer mode selected by processes to communicate with another process via the inter process communication facility of FIG. 1.

Sending data in LOCATE mode as represented in FIG. 6 is similar to using MOVE mode. A sender, process P1, tells the data access control function, IPCF, where the data is located in storage, Data Buffer A in Storage Pool X, by supplying a DOD. Specifying LOCATE mode means the sender P1 allows the receiver P2 to be given the location of Data Buffer A, of the data that is sent. However, if the data is not received in LOCATE mode by P2, or if no shared storage exists, as is the case with P1 to P3 communication, it will still be necessary for the data access control function to make a copy of the data into Data Buffer B of Storage Pool Y.

The use of LOCATE mode on a send operation requires that the storage containing the output data must remain available for the duration of the associated send operation.

Receiving data with LOCATE mode is somewhat different from MOVE mode. When data is received in LOCATE mode, the data access control function tells the receiver where the data is located rather than the receiver indicating where to place the data. The receiver supplies a blank data in descriptor (DID) with the receive operation. The elements of this descriptor are filled in by the data access control function. Each descriptor element contains the length and address of a portion of the data. The segmentation of the data as seen by the receiver may not be the same as seen by the sender. If the sender and receiver have shared storage, there most likely would be no need for the data access control function to alter the segmentation of the data. However, if the data must be moved, the data will be segmented as needed by the data access control function.

If the data was sent in MOVE or PASS mode, or the sender and receiver do not have access to shared storage, then a copy of the data will have to be made when the data is received in LOCATE mode. The data access control function obtains storage for the copy. This storage comes from storage accessible to the receiver such as Data Buffer B for Process P3 in FIG. 6. The data access control function frees any storage it obtained on the completion of the request.

The FREEBUF/GETBUF mode allows sending and receiving processes to pass the responsibility for managing buffers that contain data from the sending to the receiving process. FREEBUF applies to data being sent. GETBUF applies to data being received.

In MOVE, PASS and LOCATE modes, the sender has responsibility for the storage containing the data sent. Intermediate copies may be made and the receiver may be allowed to access the storage directly, but the storage containing the original copy of the data still belongs to and is the responsibility of the sender. When FREEBUF mode is used, the sender gives up responsibility for the storage containing the sent data. Once data is sent in FREEBUF mode, the sender can forget about the storage containing it. The data access control function will ensure that this storage is later freed or that the responsibility for it is passed on to the receiver. The sender must not reference data that has been sent using FREEBUF mode.

Figure 7:
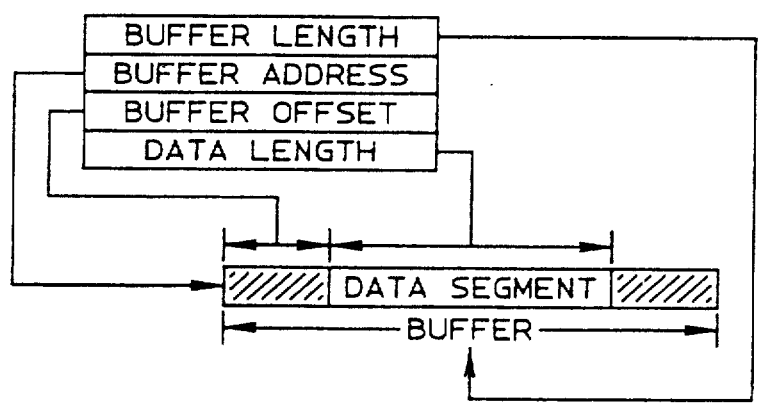
FIG. 7 is a block diagram representation of a descriptor element used by the inter process communication facility of FIG. 1 to identify storage areas.

Buffers are described to the data access control function using data descriptors as in FIG. 7, just as with other data transfer modes. Each buffer descriptor element contains the length and address of a buffer that the sender is transferring control of. However, the entire buffer does not need to be included in the actual data stream being sent or received. The sender can supply a buffer offset and data length into the buffer to indicate the data segment in the buffer to be included in the output byte stream. When the data is received, only this portion is made available to the receiver. The entire buffer is still either freed by the data access control function or passed along to the receiver if the receiver uses GETBUF mode and can access the buffer.

The capability to share storage is defined in terms of storage pools. Storage pools are just named areas of storage. Before transferring data in LOCATE or GETBUF/FREEBUF modes, the communicating processes supply IPCF with the name of the storage pool each is using by use of the Specify Storage Pool verb. If the communicating processes are local to each other and both are using the same storage pool, data will not need to be moved when transferred between them. Otherwise, IPCF assumes that no shared storage is available and will copy data that is sent. If either process uses MOVE or PASS modes, the data will always be copied.

Each user supplies the name of the storage pool it desires to use for each of its connections. The same storage pool may be used with one or more connections. If both users of a connection do not supply the same name, IPCF will copy any data sent between them. Storage pool names are given to IPCF using the Specify Storage Pool verb. A default storage pool must always be available. If a storage pool is not explicitly named, a default pool is used for LOCATE and GETBUF/FREEBUF mode operations.

Data sent, can be received in MOVE, LOCATE or GETBUF mode. Table 1 describes how storage is handled for each of the receiving modes. The numbers in Table 1 corresponsd to steps taken by the data access control function (DACF) which are indicated below:

1. The receiver provides storage to contain data being received; DACF performs a move of the data to receiver storage.
2. DACF obtains storage for a copy of the data.
3. DACF gives the receiver a pointer to a copy of the data (in either storage of the sender or storage obtained by DACF).
4. Sender does not touch original storage until completion of the Send operation.
5. Sender may reuse original storage immediately on completion of the Move operation by DACF.
6. DACF frees sender storage at completion of the request.
7. Receiver is given control of the buffer containing the data (may be original sender's buffer or one obtained by DACF); DACF frees buffers not received.
8. DACF frees storage it obtained (that contained a copy of the data) at completion of the receive operation.

| Mode Used by Receiver | Storage Mode Used by Sender | | | |
|---|---|---|---|---|
| | MOVE | LOCATE | PASS | FREEBUF |
| MOVE | 1,4 | 1,4 | 1,5 | 1,6 |
| LOCATE (Shared storage available) | 2,3,4,8 | 3,4 | 2,3,5,8 | 3,6 |
| LOCATE (Shared storage not available) | 2,3,4,8 | 2,3,4,8 | 2,3,5,8 | 2,3,6,8 |
| GETBUF (Shared storage available) | 2,3,4,7 | 2,3,4,7 | 2,3,5,7 | 3,7 |
| GETBUF (Shared storage not available) | 2,3,4,7 | 2,3,4,7 | 2,3,5,7 | 2,3,6,7 |

TABLE 1

IPCF preferably does not provide storage or buffer management services. Each implementation of IPCF makes use of storage management facilities that are provided by the local operating system of the processor in which the processes reside. IPCF uses these facilities to allocate and free storage as needed for use with locate and GETBUF/FREEBUF modes. The storage for these modes comes from the appropriate storage pools at each processor.

REFERENCING DATA

In the course of carrying out a request, a server process may send work requests to other processes. It is not necessary for an intermediate process to receive data that it only intends to pass along to a secondary server. IPCF provides a means by which the data associated with a given request, referred to as a byte stream, can include data from the byte stream of other requests. This capability is called data referencing and is provided for in the Send Request verb.

Referenced data is associated with an outstanding request sent to the process referencing that data and not received as by use of the Receive Data verb by the process referencing that data on a Send Request verb.

Figure 8:
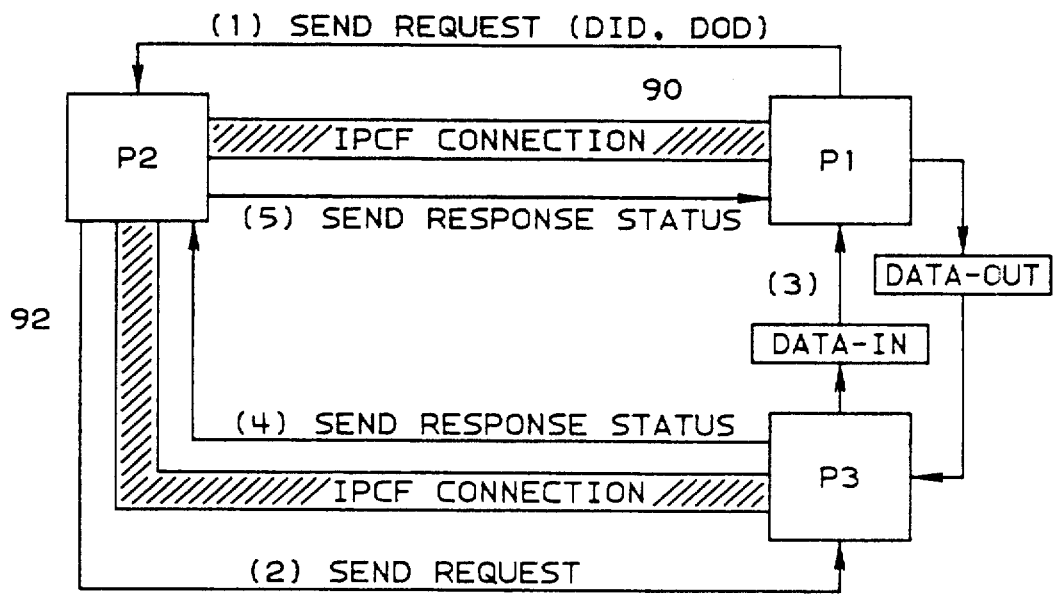
FIG. 8 is a block diagram representation of referencing data by use of the inter process communication facility of FIG. 1.

One example of referencing data is indicated in FIG. 8 wherein three processes, P1, P2 and P3 are communicating. P1 initiates a Send Request verb (1) to P2 via an IPCF connection 90 which specifies storage locations from which data is to be communicated out and storage locations into which data is to be read in. The locations are indicated by means of Data-In (DID) and Data-out (DOD) descriptors accompanying the verb.

P2 in turn issues a Send Request verb (2) on an IPCF connection 92 between P2 and P3. P2, in this example, does not act on the data specified by P1, but references it on the Send Request (2) from P2 to P3. Since P2 does not act on the data referenced, no data movement occurs between P1 storage and P2 storage and data buffers in storage accessible to P2 are therefore not required.

The transport mechanism (38 and 40 in FIG. 1) then moves the data (3) in and out of the storages in P3 and P1 without involving storage from P2. P3 then sends a response containing completion status (4) back to P2, and P2 sends a response containing completion status (5) back to P1. At this point, P1's request is complete.

One aspect of referencing data is that the data need not be located in one contiguous area of storage. In fact, it need not be located totally in the storage of one processor. This aspect of referencing data is referred to as a distributed logical byte stream. A distributed logical byte stream is logically one byte stream of data which physically resides in one or more processors connected by a physical transport mechanism and is not required to follow the physical path of a work request with which it is associated.

With distributed logical byte streams, a server processing a work request is not sensitive to the physical location of each of the pieces that make up the stream. It is also not aware that the work request may have originated from a source in one processor and its associated data (the distributed logical byte stream) from another source in a different processor.

A distributed logical byte stream is capable of being passed among a hierarchy of servers without receiving it first. Work requests related to a distributed logical byte stream pass through the servers which may reside and execute in different processors connected by a transport mechanism. The data that makes up the distributed logical byte stream does not need to be physically moved along with the work requests. Only when the logical byte stream is received is it moved directly to the memory in the processor where it is received.

Figure 10:
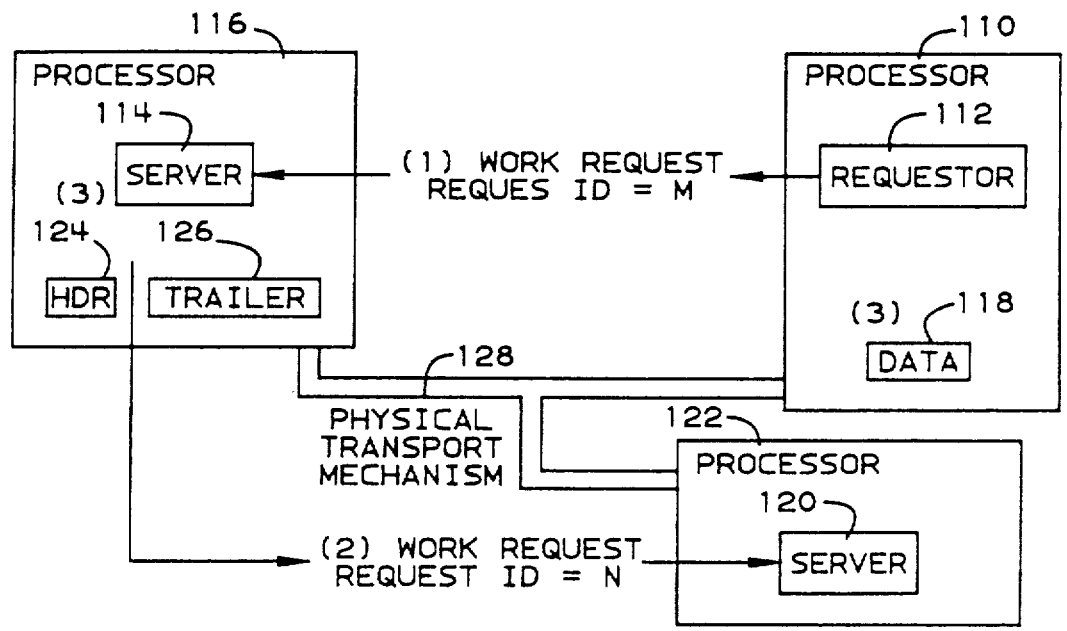
FIG. 10 is a block diagram representation of a distributed data stream.

A new distributed logical byte stream can be constructed without physically moving other portions of the byte stream that reside in other processors' memory (FIG. 10.) For example, header and trailer information may be added to the original byte stream to form a new logical byte stream. The header and trailer are in the memory of one processor and the original byte stream is in the memory of another processor.

A distributed logical byte stream may be segmented by dividing it into a number of new logical byte streams (FIG. 11) where each of the new byte streams is associated with a separate work request.

Figure 9:
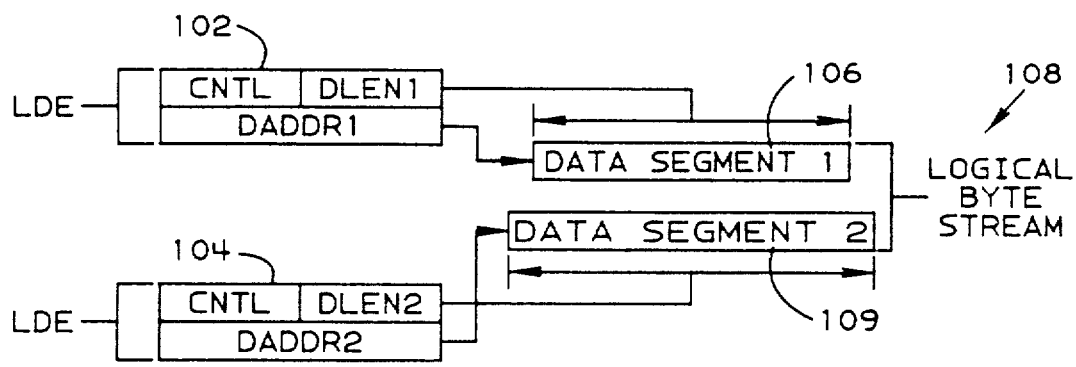
FIG. 9 is a block diagram representation of descriptor elements used by the inter process communication facility of FIG. 1 to identify storage locations of segments of data.

The data structure which describes a distributed logical byte stream comprises descriptor elements in a work request as previously referred to in discussion relating to FIG. 2. Local descriptor elements contain an address and length pair that describe one piece of the distributed logical byte stream. A local descriptor element is used for each contiguous piece of storage that contains a part of the byte stream that resides in the memory of the initiator of the request. In FIG. 9, two local descriptor elements are indicated at 102 and 104. Each descriptor is representative of a segment of data by containing a length and address. The data segments are combined at 106 and 109 consistent with the order of the descriptor elements in the work request to form the logical byte stream 108.

A reference descriptor element contains a request identifier that identifies a logical byte stream that is being referenced by providing a logical pointer to the portion of the distributed logical byte stream that is referenced. It points to a set of descriptor elements in a buffer which describe the logical byte stream being referenced. The reference descriptor element also contains the length of the desired data in the referenced logical byte stream and an offset to the start of the desired data in the referenced logical byte stream. The request identifier in the reference descriptor element provides access to a set of referenced descriptor elements maintained by IPCF that describe the entire logical byte stream that is being referenced.

An ordered list of local and reference descriptor elements describes the entire distributed logical byte stream and defines the order of each of the pieces that make up the distributed logical byte stream.

FIG. 10 indicates one potential data flow when the logical byte stream resides in more than one processor. A first processor 110 contains a requestor 112 which sends a work request to a server process 114 in a second processor 116. The work request is identified by a request identifier "m". Associated with this work request is data in the form of a logical byte stream indicated at 118.

A DOD consisting of local descriptor elements which describe the distributed logical byte stream 118 accompanies the work request. The description includes a set of address and length pairs that describe the length of data that make up the logical byte stream in processor 110. Data structures sent across the transport mechanism from processor 110 to processor 116 include request id "m", connection id, and descriptor elements that indicate the processor address 110 containing data 118, and the storage addresses and lengths of data 118 in processor 110. Server 114 sends a work request to a server 120 in a third processor 122 by means of a work request having a request id of "n". Associated with this work request is header and trailer data indicated at 124 and 126 respectively which is described in work request "n" along with a description of the byte stream at 118. The description of the combined logical byte stream reference associated with work request "n" comprises the address of processor 116 and the memory address and length of header 124 in processor 116, the address of processor 110 and the memory address and length of data 118 in processor 110, and the address of processor 116 and the memory address and length of trailer 126 in processor 116.

Server 120, as part of its processing of work request "n", issues a receive for the logical byte stream. This results in the direct movement of the logical byte stream from the memories of processor 110 and processor 116 across a transport mechanism 128 into processor 122. Process 120 specifies where it wants the data with datain descriptor elements. Process 120 only is aware of its copy of the logical byte stream and does not know that the original data is located in multiple processors.

The data access control function also provides for segmentation of a distributed logical byte stream into a number of new logical byte streams. Each of the new byte streams may be associated with separate work requests.

Figure 11:
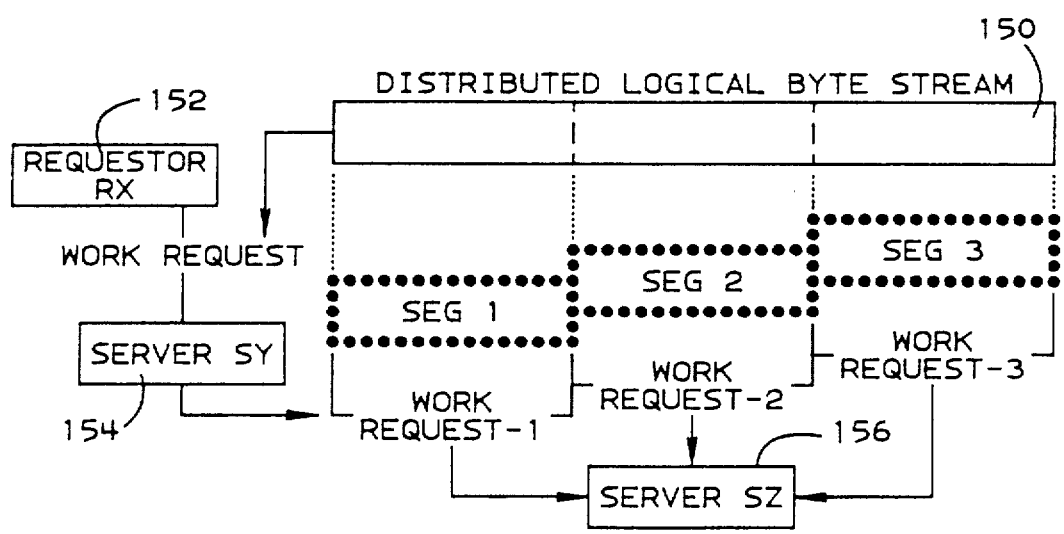
FIG. 11 is a block diagram representation of segmentation of a distributed data stream to form new distributed data streams.

In FIG. 11, segmentation of a distributed logical byte stream 150 is indicated. The byte stream 150 is referenced in a work request from a requestor 152 to a server 154. Server 154 in turn prepares three work requests referencing segments of the byte stream 150, SEG 1, SEG 2 and SEG 3 respectively. These work requests are received by a server 156, or other servers which then receive the data, or prepare further requests.

DETAIL OF THE VERB SET

OPEN

The Open verb establishes an IPCF connection between two processes. The Open verb, when issued, causes IPCF to create a logical connection between the process that issued the Open verb and the target process. The target of the Open verb is identified through an entity name. The Open verb establishes the connection to a new or already executing instance of a Program based on the entity name supplied on the Open verb.

The Open verb comprises an entity name used by IPCF and the associated operating systems to determine the program and executing instance of that program (i.e. process) to which the connection is to be made. A connection id identifies the connection that is returned by IPCF. It is used to refer to this connection on subsequent operations. A particular connection id is only known within a single processor. Two connected processes will in general have different connection ids for the same connection. Connection ids are assigned by the local IPCF and are unique within a processor.

A return code is used by IPCF to indicate to the process completion of the Open verb.

CLOSE

The Close verb is used to break or disconnect the logical connection between two processes. The Close verb can be issued from either process or both processes. Once the Close verb is issued, the issuing process is prevented from initiating any new work requests on that connection. The connection will remain open until all outstanding requests are completed or terminated. The close is not allowed to complete until the other process accepts positive notification of the Close verb.

There are two types of Close verbs, controlled and immediate. The controlled close is used for normal disconnects. It allows the process to complete any requests that are either already received or on the process's input queue when the close was issued. The immediate close is used for errors and abnormal disconnects.

The close verb contains a connection id which identifies the connection to be disconnected. The type of close verb, controlled or immediate is also specified, and a return code is provided.

SPECIFY STORAGE POOL

Specify Storage Pool allows a process to indicate to IPCF a storage pool that is potentially shareable with other IPCF users. Only one storage pool may be specified per connection a process has. This verb is issued by a process if it has no outstanding requests.

The Specify Storage Pool verb contains a connection id, the entry point address of a user supplied storage management routine, the name of the storage pool to be used for locate and getbuf/freebuf modes, and a return code.

The entry point address of a user supplied storage management routine is used by IPCF to allocate and free storage in the storage pool specified. The system supplied storage manager will be used if the entry point is not specified.

SEND REQUEST

Send Request sends a request to a server. The target process (the server) is specified by supplying the appropriate connection id. The connection id was returned to the source process when the connection to the target was established. The work request for the server is specified with a request descriptor parameter. This request contains the command for the server and any related parameters.

Figure 12:
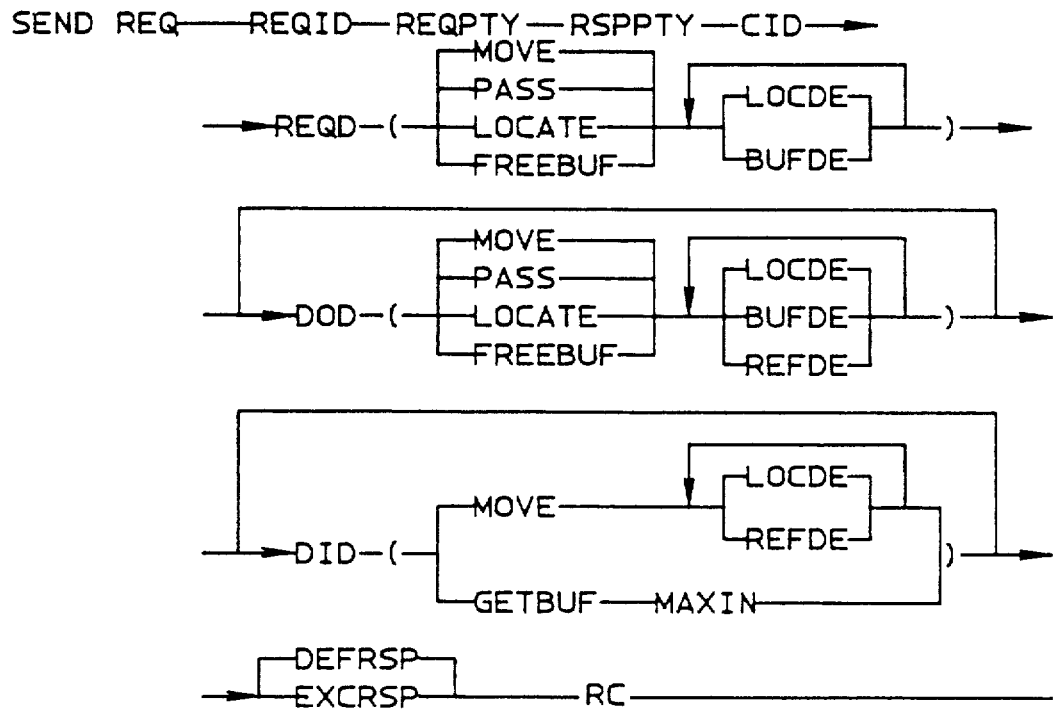
FIG. 12 is a syntax diagram of a send request verb used by processes to interface with the inter process communication facility of FIG. 1.

A syntax diagram for parameters contained in a send request verb is represented in FIG. 12. The diagram starts with a send request (send req) parameter which indicates that this is a send request verb to IPCF. Where solid lines branch in the diagram, this indicates that either line may be taken and the appropriate indicated parameters supplied in the verb. The following is a list of the parameters with the abbreviations used in the diagram.

Cid Connection id

Rid Request ID All Rids are only unique within a single processor. Two connected processes will in general have different Rids for the same request. Each of these processes is only aware of the Rid given it by its local IPCF. An Rid is a token, understood by the local IPCF, that refers to a specific request.

Reqpty Request Priority. The priority of a request determines the placement of the associated Request note on the server's input queue.

Rsppty Response Priority. When the server completes this request, it may return status to the requestor. The requestor gets this status in a Response note on its input queue. The priority of the response determines the placement of this Response note on the requestor's input queue.

REQD Is a request descriptor which specifies the data transfer mode to use for the request and describes how the request is laid out in the requestor's storage. Since the request does not need to be contiguous in storage, this descriptor contains sets of descriptor elements, one for each portion of the request.

DOD Is a Data-out Descriptor. If data is to be sent as a part of this work request, a data-out descriptor is supplied. The DOD specifies the data transfer mode to use for the output data. It also describes how the output logical byte stream is to be constructed.

DID Is a Data-in Descriptor. If data is to be returned as a part of this request, a data-in descriptor is supplied. Returned data can be placed in the requestor's storage, or it can be passed directly to another process, using reference descriptor elements. Local descriptor elements indicate that data is to be returned to storage defined by the requestor. If GETBUF is specified for the returned data, descriptor elements returned in the response note describe the returned data. There will be one descriptor element in this list for each area of storage that comprises the returned data.

MOVE Indicates that data being sent or returned is to be transferred in move mode.

PASS Indicates that data being sent is to be transferred in pass mode.

LOCATE Indicates that data being sent is to be transferred in locate mode.

FREEBUF Indicates that data being sent is to be transferred in FREEBUF mode. The requestor gives up responsibility for the storage containing the data or request sent in freebuf mode.

GETBUF Indicates that returned data is to be transferred in getbuf mode. The requestor assumes responsibility for managing the storage containing the data returned in getbuf mode.

Maxin Specified the maximum amount of data, in bytes, that can be returned by the server for this request. The server may return less than this amount, but will be given an error if it attempts to return more. The actual amount of data returned can be determined by examining the buffer descriptor elements for the returned data.

Locde Is a local descriptor element. It describes one segment of a logical byte stream. With a REQD or a DOD, this descriptor specifies the length and address of an area of storage, addressable by the requestor, that contains a portion of the overall request or data-out. With a DID, this descriptor specifies the length and address of an area of storage, addressable by the requestor, into which a portion of the overall data-in stream is to be placed.

Bufde Is a buffer descriptor element which describes a single buffer. A buffer is a unit of storage for which responsibility can be obtained (with getbuf) or given up (with freebuf). The data within the buffer that is a portion of the byte stream must be contiguous, but may be shorter than the entire buffer. Buffers must be allocated from the storage pool associated with the connection over which data in the buffer is being sent or received. The buffer descriptor comprises a buffer address, length, offset within the buffer to the start of the actual data, and a data length.

Refde Is a reference descriptor element which references data within a logical byte stream that is associated with another request. When used in a DOD, the data referenced is an input data-stream to the server process that is the target of the SEND REQ. When used in a DID, the data area references in an output data stream relative to the server process that is the target of the SEND REQ. The reference descriptor element comprises a reference request id which is the Rid for the request associated with the data being referred to. It also contains an offset within the byte stream associated with the reference RID which identifies the origin of a portion of the referenced byte stream that is to be included with the new logical byte stream being formed. It is relative to the beginning of the referenced byte stream. The first byte of the referenced data stream has an offset of zero. The reference descriptor element finally comprises a data length which is the number of bytes from the referenced data stream to be included in the data stream segment being defined.

DEFRSP Indicates that the server must return status and, optionally, extended status on the SEND RSP. The status is placed in the response note on the requestor's input queue.

EXCRSP Signifies that the server is to only return exception status to the requestor. The server is given the definite or exception response indication in the request note on the server input queue. The server uses this indication to determine whether status is to be returned. If the server does not specify status on the final SEND RSP, then a response note is not placed on the requestor's input queue. If the server specifies status on SEND RSP, then a response note containing status is placed on the requestor's input queue.

Rc Return code which is returned by IPCF.

SEND RESPONSE

The Send Response verb is used by the server to return status and data to a requestor. Since a server may be processing multiple requests at any one time, a Request id is specified with this verb. This id indicates which request the information being sent is associated with. The request id for a request is contained in the request note that the server receives for each request.

The server can send portions of the data as they become available. The server's view is that it is just sending a string of bytes to the requestor; each SEND RSP supplies the next part of the string. The server has no knowledge of where the data is placed in the requester's storage, or how the requestor happened to segment its data buffer.

Figure 13:
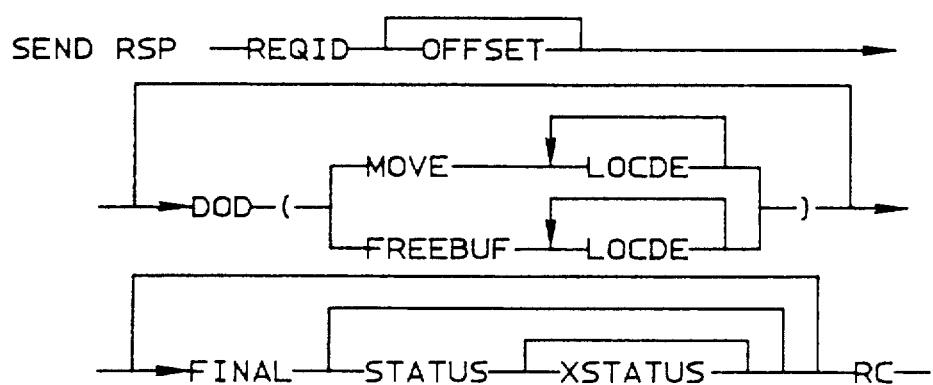
FIG. 13 is a syntax diagram of a send response verb used by processes to interface with the inter process communication facility of FIG. 1.

A Send Response parameter description is indicated in a syntax flowchart in FIG. 13. Four parameters not described in conjunction with the SEND REQUEST verb described above follow:

Offset Defines an offset into the output data stream to place the data sent. If not specified, successive executions of SNDRSP (for the same Rid) will return successive portions of the data.

FINAL Indicates that this is the final response for the specified request id and that all processing of the request is complete.

Status Indicates the final completion status for the entire request.

Xstatus Provides extended status on the response from the server to a requestor and is optional.

RECEIVE QUEUE

Figure 14:
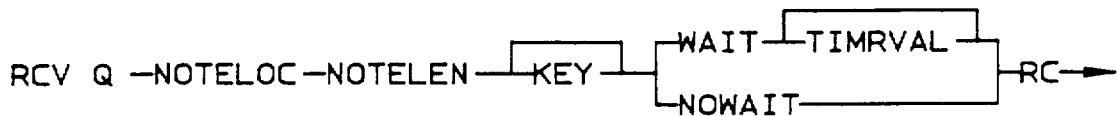
FIG. 14 is a syntax diagram of a receive queue verb used by processes to interface with the inter process communication facility of FIG. 1.
Figure 14:
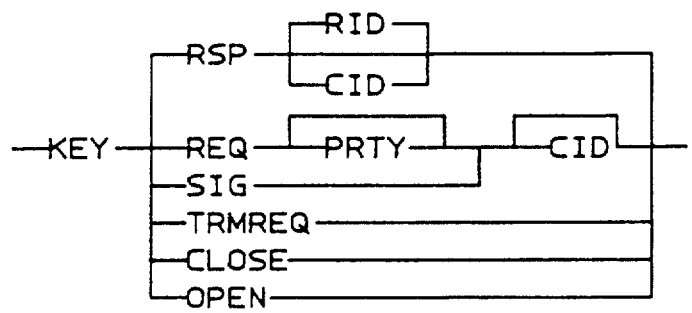

The Receive Queue verb is issued to obtain notes that are on a process's input queue. There are six kinds of notes:
1. Request
2. Response
3. signal
4. Open
5. Close
6. Terminate Request Normally, when a Receive Queue is done, the process is given the first note on the queue. The receiving process can supply a key with Receive Queue that will limit what note it will accept with that Receive Queue. A Receive Queue Parameter description is indicated in a syntax flowchart in FIG. 14. RCV Q indicates the receive from input queue form of Receive. Other parameters not previously described are described in the following:

Key Describes a key which is used to restrict the notes accepted with this Receive Queue. The key contains subparameters permitting the specification of which of the six notes to Receive from the input queue. When a response is indicated as being acceptable by the key, the request.. id or connection id may be specified as well. On the receive request indication, the key may specify a priority level from which to receive from the queue. The connection id may be specified on both the request note indication and the signal indication. Thus, a specific response note may be accepted.

Timrval Is the timer value in milliseconds that the issuer of RCV Q will wait for the response.

Noteloc Is the address in the requestor's storage where the response note is to be returned.

Notelen Defines the size of a buffer area in the requestor's storage where the response note is to be returned. The buffer area must have sufficient space to contain any of the potential notes that could be returned.

WAIT Indicates that a process is to be suspended if Receive Queue is not satisfied.

NOWAIT Indicates that a process will not be suspended if Receive Queue is not satisfied.

Request notes are placed on a process's input queue when it is the target of another process's Send Request. Then the Receive Queue is executed, the receiving process is given this Request Note. The Request Note contains the following information:
Connection id for the connection to the requestor
Request id for this request
Request length
Number of request segments
Data-in length
Number of data-in segments
Request priority
Indicator—requestor specified definite or exception response Response notes are placed on a process's input queue when some other process executes a Send Response with Completion status indicating that a work request has been completed. The response note contains the following information:
Connection id for the connection to the server
Request id for the request that was completed
Completion status
Buffer Descriptor Element describing the data-in buffer passed to the requestor.

Signal notes are placed on a process's input queue when it is the target of another process's Signal. Signal notes are used to send small amounts of data between two processes. The Signal note contains the following information:
Connection id over which the Signal was received
Signal Type (see discussion of Signal verb)
Data Open notes are placed on a process's input queue when a connection to it has been established at the request of another process. The Open note contains the following information:
Connection id
Status field containing IPCF status Close notes are placed on a process's input queue when a connection to it is or has been broken by another process. The Close note contains the following information:
Connection id
Close type (Whether the pending Close was immediate or controlled, and whether the Close is complete.)
Status field Terminate Request notes are placed on a server process's input queue if the requestor terminates an outstanding request. The Terminate Request note contains the following information:
Connection id identifying the connection whose requests are terminated.
Request id identifying the terminated request
Indicator—a single request or all requests on a connection are terminated
Status field.

RECEIVE REQUEST

The Receive Request verb is used to receive a work request that has been sent using Send Request. This request is identified by a Request Descriptor of the Send Request verb. The receiver must supply a Request id and a Request Descriptor. The Request id indicates which work request is to be received. The Request Descriptor describes the buffer segments in the server's storage that are to contain the received data.

Figure 15:
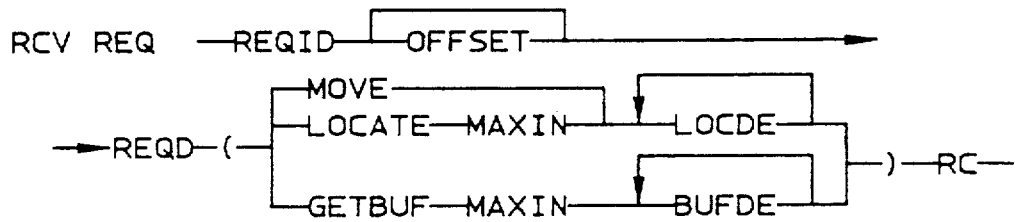
FIG. 15 is a syntax diagram of a receive request verb used by processes to interface with the inter process communication facility of FIG. 1.

A syntax diagram in FIG. 15 shows the parameters of the Receive Request verb. All of the parameters used have been previously described. The Receive Request verb operates in Move, Locate or Getbuf modes. In Move mode, the receiver specifies a local storage address; the received work request is placed there. In locate and getbuf modes, IPCF returns to the receiver the address of the work request in local storage. In either case, the actual length of the work request will be placed in the Request Descriptor.

To facilitate the use of locate and getbuf modes, the Request note received by the server contains the total length and the number of storage pieces the work request is divided into. This allows a Request Descriptor to be constructed such that the entire request stream can be received with a single Receive Request, if desired.

In move mode, the Request Descriptor describes where the returned work request is to be placed. The request does not need to be placed into contiguous storage, but can be divided into portions as desired by the receiver. One local descriptor element is supplied for each portion of the request.

The use of locate mode indicates that the receiver wants access to the storage containing the work request. It does not want its own copy. To receive in locate mode, one supplies a maximum data length to receive and a number of unused local descriptor elements. Unused descriptor elements only have the type field filled in. The address and length fields are undefined. When the work request is received, these descriptor elements are filled in by IPCF. One descriptor is used for each segment of returned information.

The use of getbuf mode indicates that the receiver wants responsibility for the storage containing the work request. To receive in getbuf mode, one supplies a maximum data length to receive and a number of unused buffer descriptor elements. Unused descriptor elements only have the type field filled in. The remainder of the information is filled in by IPCF when the work request is received. One descriptor is used for each segment of returned information.

To understand how the parameter offset works, one can consider that IPCF maintains a pointer into the logical byte stream. This pointer identifies the location for the next byte to be received from the byte stream. When a Receive Request is executed, the data returned comes from the request byte stream beginning at this location. The pointer is incremented by one for each byte received. If offset is specified, this pointer is set to the offset value before the data is received. The pointer is incremented as usual, so that data for subsequent Receive Requests that do not specify Offset will come from the request byte stream beginning with the byte following the last one received.

RECEIVE DATA

Receive data is used to receive data that has been sent using Send Request. This data was identified by the Data-out Descriptor of the Send Request. The receiver must supply a request id and a data-in descriptor. The request id indicates which request's data is to be received. The Data-in Descriptor describes how the data is to be received.

Figure 16:
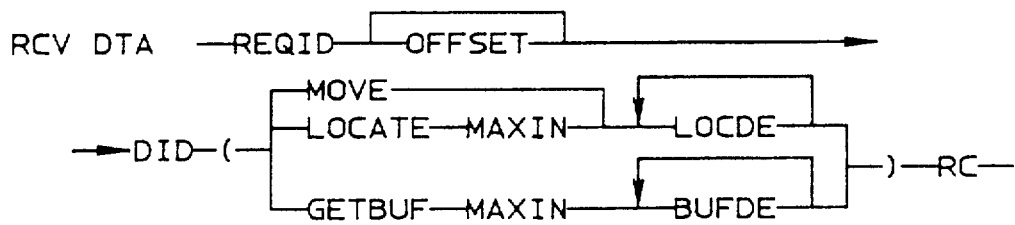
FIG. 16 is a syntax diagram of a receive data verb used by processes to interface with the inter process communication facility of FIG. 1.

A syntax diagram for parameters comprising the Receive Data verb are indicated in FIG. 16. The parameters have been previously described.

SIGNAL

The Signal verb allows a process to send a small amount of data to another process. It causes a Signal note to be placed on the target process's input queue. Since no response is expected, there is no Rid assigned to a signal operation.

One use of Signals includes:
Returning intermediate status for a long running request.

The Signal verb is comprised of four parameters, Cid, Signal type, data (optional), and a return code.

TERMINATE REQUEST

The Terminate Request verb is used to indicate that the processing of one or more requests is to be stopped. To terminate a single request, a Request id is supplied.

While the present invention has been described in terms of a preferred embodiment, it will be apparent to one skilled in the art that the invention has broad applicability. Both single processor and multiprocessor environments having multiple processes executing thereon will obtain benefits from the present invention in the form of reduced storage requirements for the processes and easier queue management. The transparency features of the present invention enable much more efficient resource allocation because of the enhanced mobility of the processes.

What is claimed is:

1. A method of working with a fragmented data stream having multiple pieces of data in a multiprocess computer system which has a plurality of storage areas directly accessible by selected processes, the method comprising:
   a) identifying a storage area containing a piece of data;
   b) identifying a starting address in the storage area of the piece of data;
   c) identifying a length of a piece of data;
   d) performing the above three steps to form a descriptor element for each piece of data in the fragmented data stream, wherein said pieces of data are stored in different storage areas;
   e) using a first processor to combine the descriptor elements formed in steps a through d to form a logical representation of the fragmented data stream for use by processes for work on the data stream;
   f) transferring said logical representation from said first processor to a second processor independent of the pieces of data; and
   g) using a descriptor element contained in said logical representation to transfer to said second processor a corresponding piece of data required by a process running on said second processor to perform said work, so that pieces of data need not be transferred unless required by a process running on said second processor to perform said work.

2. The method of claim 1 further comprising the steps of:
   h) generating, with said second processor, a further piece of data to add to the data stream;
   i) identifying, with said second processor, the further piece of data with a further descriptor element; and
   j) using said second processor to add the further descriptor element to the logical representation of the data stream so that the further piece of data is included in the data stream without needing to transfer the further piece of data.

3. A multiprocessor computer system comprising:
   a plurality of processes;
   a first processor for executing processes;
   a first memory associated with the first processor and accessible by processes executing on said first processor, the first memory having multiple storage locations for storing data;
   a second processor for executing processes;
   a second memory associated with the second processor and accessible by processes executing on said second processor, the second memory having multiple storage locations for storing data;

said first and second memories storing a data stream made up of multiple pieces of data stored at locations in the first and second memories;

a bus transport mechanism connecting said first and second processors for transferring information between processes executing on the first and second processors to provide processes access to pieces of data stored in the first and second memories; and said first and second memories further storing a plurality of descriptor elements coupled together to form a logical representation of the data stream, each descriptor element identifying a location in the first or second memory containing a piece of data, said logical representation of the data stream identifying the data stream, and being transferred between processes by the bus transport mechanism, said processing changing the data stream by modifying the logical representation without transferring data.

4. The multiprocessor computer system of claim 3 wherein each piece of data is stored in a memory associated with a processor and wherein each processor has an identifying address, and each descriptor element contains the identifying address of the processor associated with the memory where the piece of data described by the descriptor element is located.

5. A data management mechanism in a loosely coupled distributed processor system wherein each process has an associated storage directly accessible by processes running on the processor, said processes performing work related to a work request, the mechanism at each processor comprising:

means for creating descriptor elements, each element identifying a storage location and length of a respective segment of data identified by a process on the same processor as the data management mechanism;

means for combining descriptor elements from different processors to form a data descriptor identifying at least two data segments, each segment identified by a process performing work on the same work request, wherein at least two different processes identify data segments identified by the data descriptor;

means for transferring data descriptors between processors independent of the data segments;

selection means for a process to which a data descriptor is transferred to determine which of said data segments identified by the data descriptor are required by the process to perform work related to a work request; and means responsive to said selection mans for said process to which a data descriptor is transferred to obtain a data segment identified by the data descriptor and required by said process to perform work without obtaining other data segments identified by the data descriptor.

6. The data management mechanism of claim 5 said data management mechanism further comprising at each processor:

data access means for accessing the storage associated with the processor;

data transfer means for transferring data to data management mechanisms on other processors; and data access control means coupled to the processes at the processor for providing data in storage accessible to the processes as requested by the processes so that the processes do not need to know the location of the data segments as identified by the data descriptors for which access is not required to perform the work.

7. The data management mechanism of claim 6 wherein each process comprises means for generating local descriptors which identify locations in storage accessible by the process, and providing the local descriptors to the data access control means.

8. A method of referencing data in a loosely coupled multiprocessor system having storage directly accessible by processes running on said processors, said storage containing segments of data used and referenced by the processes, the method comprising the steps of:

a) generating a descriptor element for each process referenced segment of data residing in storages of different processors, each descriptor element representing a location in storage of each data segment;

b) using a first processor to combine descriptor elements from different processes to form a data descriptor representative of a stream of data;

c) transferring the data descriptor from said first processor to a second processor independent of the data said data descriptor represents;

d) identifying data segments represented by the data descriptor containing data required by a process running in said second processor; and e) using said descriptor elements to transfer said data segments required by a process running in said second processor into storage accessible by said second processor without transferring data segments which are not required.

* * * * *